Figure 1:
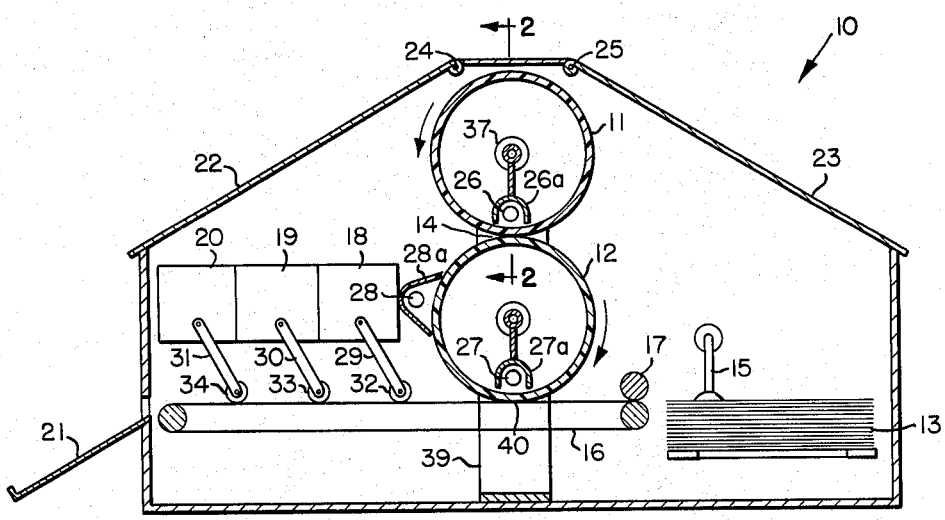

July 5, 1966 E. BERMAN ETAL 3,259,047
DATA PROCESSING SYSTEM AND METHOD THEREFOR
Filed April 15, 1964

INVENTORS
ELLIOT BERMAN
DAVID F. LOEB
BY
ATTORNEY

United States Patent Office
3,259,047
Patented July 5, 1966

3,259,047
DATA PROCESSING SYSTEM AND METHOD THEREFOR
Elliot Berman, Braintree, and David F. Loeb, Wayland, Mass., assignors to Itek Corporation, Lexington, Mass., a corporation of Delaware
Filed Apr. 15, 1964, Ser. No. 360,005
3 Claims. (Cl. 95—73)

This invention relates to a system for making a positive copy of an original document, and more particularly to a system for making a plurality of positive copies of an original document by using a reusable intermediate negative image bearing medium.

In many copying systems a medium bearing a negative image of the original document to be copied is used in forming a positive copy of the document but must be disposed of after use, thus causing a waste of expensive materials. Copying systems using other means for making positive copies of an original document are presently complex, expensive, and the quality of the copies they produce is often poor.

It is an object of the invention to overcome the deficiencies of present copying systems so as to produce high quality positive copies of an original document with a minimum of expense and a maximum of speed.

Another object of the invention is to save materials and reduce costs in a positive copying system by using a reusable intermediate negative image bearing medium.

Another object of the invention is to provide simple, and reliable, economical apparatus for rapidly producing positive copies by using a reusable negative image bearing medium.

To these and other ends the invention resides in certain improved methods and combinations, all as will be hereinafter more fully described, the novel features being pointed out in the claims at the end of this specification.

Figure 2:
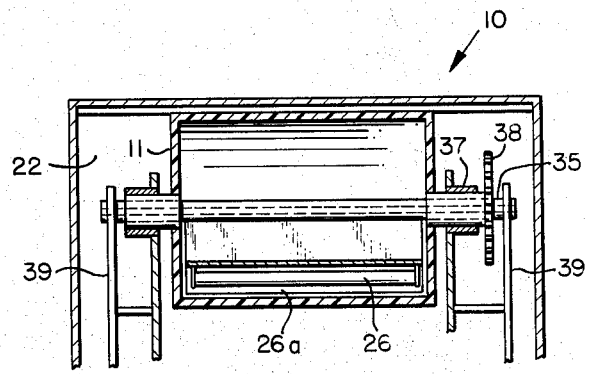

In the drawings:

FIG. 1 shows a partially schematic, partially sectioned side view of apparatus for making positive copies according to the invention; and FIG. 2 shows a partial cross section of the apparatus of FIG. 1 taken on the line 2—2.

U.S. Patent No. 2,953,454 issued to Elliot Berman on September 20, 1960, discloses the preparation and characteristics of phototropic data storage media commonly known as "photochrome" or as "photochromic" media and characterized generally by changing color in response to radiation of different wave lengths. For example, the compound of FIG. 5 of U.S. Patent 2,953,454 which comprises 1,3,3-trimethyl-6'-nitro-spiro (2'H-1'-benzopyran-2,2'-indoline) turns dark blue upon exposure to ultraviolet radiation of wavelengths below 4000 angstrom units. The blue color of this exposed photochromic medium can be erased and the medium can be returned to its normal white, or colorless state by heating or by exposure to visible or infra-red radiation of wavelengths above 4000 angstrom units. Photochromic media are compoundable that respond to different wavelengths and change to different colors. Generally, infra-red radiation is preferred for reverting a colored photochromic medium to its normal colorless state because of the speed, effectiveness, and simplicity relative to visible light or heat in causing such reversion. The above mentioned compound an intermediate negative image bearing medium according to the invention, but other compounds, including but not limited to those described in U.S. Patent 2,953,454, are suitable for use as reusable intermediate negative image bearing media in the copying system of the invention.

Generally the invention comprises forming a negative image of an original document in a photochromic or other erasable or reusable medium and using such negative image for printing a positive image on a photosensitive surface to produce a positive copy. Since the preferred photochromic medium can be quickly imaged and erased by suitable radiation, it is reusable as a negative image bearing medium not only for a succession of copies of a single original but for many originals.

A photosensitive medium preferred for use with the photochromic negative image bearing medium according to the invention is a photoconductor data storage medium disclosed in commonly owned copending Berman et al. application, Ser. No. 199,211, filed May 14, 1962, the details of which are incorporated herein by reference. Such copending application discloses copy media comprising photoconductive materials, i.e. materials having light activatable electrons, adaptable to use in the systems of the present invention. Exposure of such media to an image pattern of activating radiation renders chemically reactive those portions of the photoconductor media which are struck by radiation. The activated irradiated medium is next contacted with a developer system to effect a chemical redox reaction, on such contact, between the developer system and the activated chemically reactive portions of said medium. For example, according to the teachings of the copending application a filled of coated paper comprising a photoconductor such as titanium dioxide is exposed to an image pattern of radiation, and is then developed by simple contact with a developer system forming an image by redox reactions occurring at activated chemically reactive portions of the photoconductor. For example, the exposed medium may be contacted with a solution containing ions of a metal such as copper, silver, mercury, gold, or some other noble metal. The ions are reduced to free metal on contact with activated chemically reactive portions of the copy medium. Although exposures can be used which are sufficient to cause precipitation of such an amount of metal ion to free metal as will form a visible image in the copy medium, shorter exposure times can also be used. These result in the deposition of amounts of free metal which are insufficient to form visible images. Such "latent developed images" can be subsequently amplified by contact with developer systems of a type known in the silver halide photographic arts, for example, such as those comprising silver ion in admixture with a reagent forming a redox system, such as hydroquinone. Developer systems of this type tend to deposit further free metal on a surface where free metal is already present, and can be used in the present invention to amplify a priorly formed "latent developed image" or can be used alone in a single developing step to form a visible image directly.

The sensitivity of the photoconductor media disclosed in copending patent application 199,211 to relatively short wave lengths of radiation, and also their economy of manufacture, ease of processing, and speed make them preferred and especially satisfactory copy media for use with the reusable photochromic negative image bearing media according to the invention. Also, such photoconductor media can be erased or deactivated so as to be uniformly activatable by radiation by being heated or irradiated by infra-red radiation, so that by addition of a development and image bleaching processes can be substituted for the preferred photochromic intermediate negative medium.

The inventive copying system will be described in connection with the illustrated copying apparatus, although it will be understood that other materials and different apparatus can be used according to the invention.

The illustrated copier 10 has a rotatable original document bearing drum 11, an intermediate drum 12 coated with a photochromic medium, and a stack 13 of sheets of photosensitive material. Drums 11 and 12 rotate together and contact or nearly touch each other at 14.

Photosensitive sheets are fed from the stack 13 one-by-one by suction cup sheet feeding device 15 into the nip between an endless belt 16 and drive roller 17 for passing along endless belt 16 under and into contact with drum 12 and processing stations 18–20 to copy exit hopper 21.

Drum rotating means are not disclosed but are well known to those skilled in the copying and printing arts, and the means for feeding photosensitive sheets from the stack 13 to the exit hopper 21 are disclosed only schematically, such means being incidental to the invention, and being well known to those skilled in the sheet feeding arts. Also drums 11 and 12 can be replaced by reciprocating platens or optical exposure means and copies can be made on a continuous photosensitive strip which is cut into sheets later.

Access to copier 10 is obtained through covers 22 and 23 respectively hinged at 24 and 25 for being independently raised.

A source of preferably ultra-violet radiation 26 is disposed inside and near the bottom of document holding drum 11 which is preferably formed of plastic or quartz or other material selected for being transparent to ultra-violet radiation. Another source 27 of preferably blue or visible radiation is similarly disposed in drum 12 for directing radiation through transparent drum 12 downward toward endless belt 16. Erasing of the photochromic medium is preferably accomplished by an infra-red radiating source 28 arranged adjacent drum 27 for returning the photochromic medium to its normal colorless state.

Developing stations 18–20 are preferably containers of liquid developing agents that are metered through arms 29–31 to hollow, porous rollers 32–34. As disclosed in copending application 199,211, a variety of processes are available for developing latent images in the photoconductor coating of the photosensitive material preferred for use in the invention. Such developing steps are generally described above, are detailed in copending patent application 199,211, and are generally familiar to persons skilled in the photographic arts. Accordingly, the invention is not limited to any particular number or arrangement or form of processing stations. Also, persons skilled in the developing arts, are aware of many suitable means for contacting a photosensitive surface with developing agents other than by the use of hollow, porous rollers, such other methods including dips, sprays, wetted rollers, meniscus rollers, and wetted or soaked members, pads, and the like.

The cross section of FIG. 2 shows the mounting of drum 11, drum 12 being mounted in a similar way. A hollow, nonrotatable shaft 35 that is supported by brackets 39 supports drum 11 and ultra-violet light source 26. Electric leads for radiation source 26 are led into drum 11 through hollow shaft 35. A second hollow shaft 37 connected to a drum driving sprocket 38 is fixed to rotatable drum 11 and supports drum 11 for rotation about shaft 35 in response to rotation of the drive sprocket 38 by means not shown.

Reflectors 26a and 27a confine the radiation from respective sources 26 and 27 to relatively narrow portions of the bottoms of rotating drums 11 and 12 so that clear contact prints can be made at 14 and 40.

To produce positive copies according to the invention, an original document to be copied is fastened to drum 11 by well known means. Drums 11 and 12 are rotated together so that the original document passes through the point of contact 14 between drums 11 and 12. At the point of contact 14, ultra-violet radiation from source 26 passes through rotating drum 11 and the document to be copied, and exposes the photochromic coating of drum 12 to radiation in an image pattern corresponding to the data the document to be copied. Such exposure to ultra-violet radiation causes the exposed portions of the photochromic coating of drum 12 to change color, thus making a negative image of the document on the photochromic medium.

The imaged photochromic coating on drum 12 rotates as shown by the arrow to the point of contact 40 between drum 12 and endless belt 16. In synchronization with the rotation of drums 11 and 12, sheet feeder 15, endless belt 16 and drive roller 17 feed a sheet of photosensitive material from stack 13 to the point of contact 40 between endless belt 16 and drum 12. A sheet from the stack 13 contacts the imaged photochromic medium at point 40 where preferably visible or blue light radiation from source 27 passes through drum 12, the imaged photochromic medium, and onto the photosensitive sheet for activating the photoconductive coating on the latter to form a latent positive image.

Radiation from source 27 is selected for a range of wavelengths and an intensity which will sufficiently activate the photoconductor of the photosensitive sheet before darkening or lightening the photochromic medium beyond the point where it is unsatisfactory for forming at least one image pattern. The sensitivity of the photochromic and photoconductive media are preferably selected for being greatest at different wavelengths of light so that such media can be made differentially responsive to the radiation from sources 26 and 27. By a proper balance of media sensitivity and radiation wave lengths and intensities the negative image in the photochromic medium can be successfully irradiated for a contact print onto the photoconductive medium of the photosensitive sheet without destroying the capability of the negative image for making at least one such contact printing.

Contact printing of the photosensitive sheet by preferably visible or blue light radiation from source 27 does lighten the photochromic medium somewhat so that it is preferred to not reuse the same negative image for a subsequent contact printing exposure but to erase the image and re-expose a new negative image on the photochromic medium. To accomplish this, as the imaged photochromic coating rotates beyond point 40 it is passed under infra-red radiant source 28 and its associated reflector 28a where the photochromic medium is returned to its normal, uncolored state so as to be uniformly receptive to ultra-violet light in the formation of a new negative image of the original document. Alternatively, erasing of the photochromic medium can be omitted and a new or re-exposed negative image of the original document can be registered with the weakened negative image through which a positive print was made.

As a new negative image is being formed upon the photochromic coating of rotating drum 12, the exposed photosensitive sheet is fed under rollers 32–34 of processing stations 18–20 where its positive latent image is developed and fixed to form a positive copy of the original document. In synchronization with the arrival of the leading edge of a new negative image in the photochromic coating on drum 12, a subsequent sheet of photosensitive material is fed to point 40 for exposure through the negative image of the photochromic medium for the formation of another latent positive copy image.

Thus it can be seen, that once an original document to be copied is fixed to drum 11, and copier 10 is actuated, many copies of the original document can be produced rapidly. By using materials preferred for the inventive system, such copies are of high quality and can be produced rapidly and economically. The photochromic intermediate negative image bearing medium can be used indefinitely for making many copies of many different documents without requiring replacement.

One modification of the invention contemplated, is directed to copying from opaque or two sided originals. The original can be reflexed into the intermediate photochromic drum 12 by scanning the original with suitable optical means well known in the art. For example, scanning optics known in the xerographic art for imaging flat sheets onto a selenium drum could be used in this modification.

Exposure and processing of the copy sheet can be performed as previously described in connection with FIGS. 1 and 2.

While the invention has been disclosed herein by reference to the details of a preferred embodiment, it is to be understood that such disclosure is intended in an illustrative, rather than a limiting sense, and it is contemplated that the various modifications of the procedures, combinations, construction, and arrangement of parts will readily occur to those skilled in the art, within the spirit of the invention and the scope of the appended claims.

We claim:

1. Apparatus for making a plurality of copies of an original document and comprising in combination: a pair of drums rotatable in peripheral proximity and in timed relation, a first one of said drums having means for holding said original document, and a second one of said drums having a peripheral coating of a photochromic data storage medium; a first source of radiation fixed in position within said first drum for directing radiation through said first drum and said original document at the zone of proximity of said second drum and onto said photochromic medium on said second drum for repeatedly forming a negative image of said original document in said photochromic medium; a second source of radiation fixed in a position within said second drum and located rotationally beyond said proximate zone of imaging of said photochromic medium for directing radiation through said negative image; means operable in timed relation with rotation of said drums for feeding a succession of sheets of photosensitive material into contact with said second drum adjacent said second source of radiation so that each of said photosensitive sheets is exposed to radiation from said second source in the image pattern of said negative image for forming a positive latent image of said original document on each of said photosensitive sheets; means operable in timed relation with said exposure of said photosensitive sheets for developing said positive latent images to produce positive copies of said original document; and means arranged adjacent said second drum and rotationally beyond the zone of said exposure of said photosensitive sheets and rotationally before said proximate zone of said imaging of said photochromic medium for erasing each of said negative images after said exposure of said photosensitive sheets.

2. The apparatus of claim 1 wherein said first source of radiation is a source of radiation having a range of wavelengths less than about 4,000 angstrom units and said second source of radiation is a source of radiation having a range of wavelengths between about 4,000 angstrom units and 7,500 angstrom units.

3. The apparatus of claim 1 wherein said means for erasing said negative images is a source of infrared radiation.

References Cited by the Examiner

UNITED STATES PATENTS

| | | | |
|---|---|---|---|
| 2,233,429 | 3/1941 | Ostromislensky | 96—89 X |
| 3,085,488 | 4/1963 | Heiart | 95—75 |
| 3,105,761 | 10/1963 | Foris | 96—90 X |
| 3,168,022 | 2/1965 | Limberger | 95—77.5 |
| 3,160,064 | 2/1965 | Levy | 96—27 |

OTHER REFERENCES

"Phototropism (Photochromism)," by Brown and Shaw, published in Reviews of Pure and Applied Chemistry, vol. 11, No. 1. March 1961, pages 2 and 3 are relied on.

"Photo Methods for Tomorrow," published in Photo Methods for Industry, vol. 7, No. 3, March 1964, pages 28, 30 and 32.

JULIA E. COINER, *Primary Examiner.*

EVON C. BLUNK, *Examiner.*